(12) United States Patent
Prochazka et al.

(10) Patent No.: US 7,407,690 B2
(45) Date of Patent: Aug. 5, 2008

(54) PROCESS FOR SURFACE MODIFICATIONS OF TIO₂ PARTICLES AND OTHER CERAMIC MATERIALS

(75) Inventors: Jan Prochazka, Reno, NV (US); Timothy Malcome Spitler, Fernley, NV (US)

(73) Assignee: Altair Nanomaterials Inc., Reno, NV (US)

( * ) Notice: Subject to any disclaimer, the term of this patent is extended or adjusted under 35 U.S.C. 154(b) by 893 days.

(21) Appl. No.: 10/806,698

(22) Filed: Mar. 23, 2004

(65) Prior Publication Data

US 2005/0214466 A1    Sep. 29, 2005

(51) Int. Cl.
    *B05D 3/02*    (2006.01)
(52) U.S. Cl. .................................. 427/372.2

(58) Field of Classification Search ............... 427/376, 427/376.6, 372.2, 337, 352, 353, 215, 218; 428/403
See application file for complete search history.

(56) References Cited

U.S. PATENT DOCUMENTS

| 3,127,280 A | | 3/1964 | Whately |
| 3,936,304 A | * | 2/1976 | Kasugai et al. ............... 430/536 |
| 5,785,748 A | * | 7/1998 | Banford et al. ............... 106/443 |
| 6,365,545 B1 | * | 4/2002 | Komatsu et al. ............... 502/326 |
| 6,440,383 B1 | | 8/2002 | Duyvesteyn et al. |

FOREIGN PATENT DOCUMENTS

EP    1245646 A    10/2002

* cited by examiner

*Primary Examiner*—Michael Cleveland
*Assistant Examiner*—Briget P Ngampa
(74) *Attorney, Agent, or Firm*—Brinks Hofer Gilson & Lione; G. Peter Nichols

(57) ABSTRACT

A method of preparing a surface modified ceramic material.

17 Claims, 15 Drawing Sheets

Fig. 1 Surface modification scheme

Surface modification step 1 - Creating a titanate layer on an anatase nanoparticle in an aqueous slurry. M is an alkali metal.

Surface modification step 2: Conversion of the alkali metal titanate layer into a Ti-hydrate gel layer and further calcining Doping of the gel layer on the base.

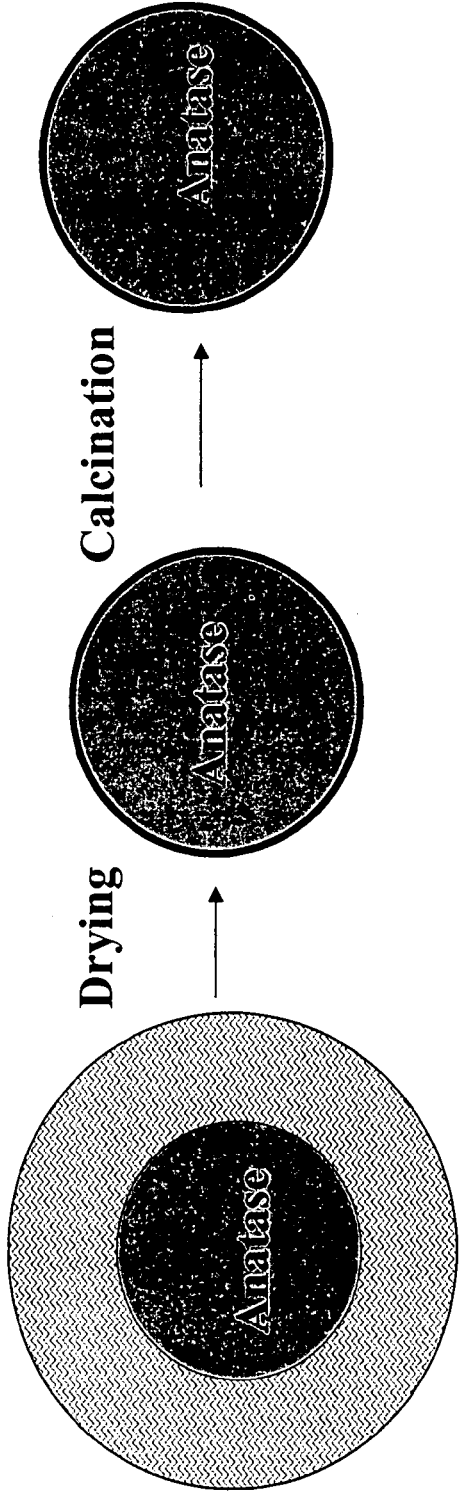
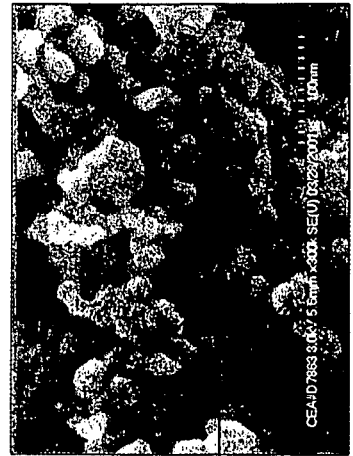
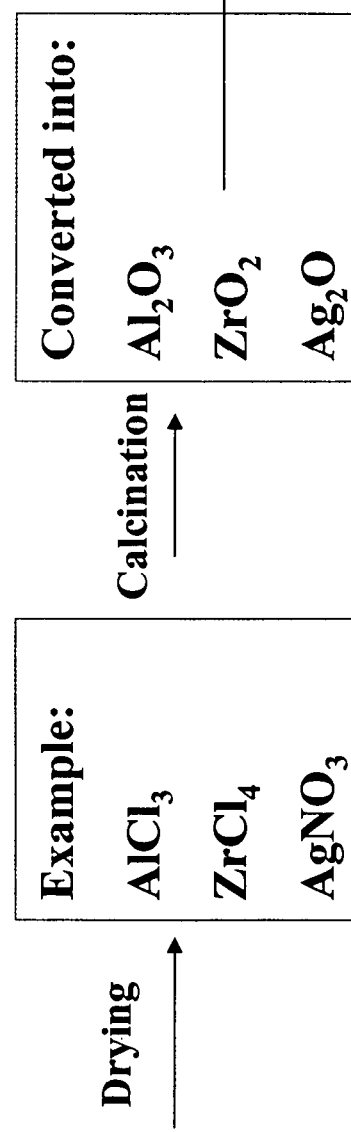
Example:
AlCl$_3$
ZrCl$_4$
AgNO$_3$
Drying →
Calcination →
Converted into:
Al$_2$O$_3$
ZrO$_2$
Ag$_2$O
Fig. 5a  Drying of the doped material and conversion of the dopant in a calcination step
Fig. 5b

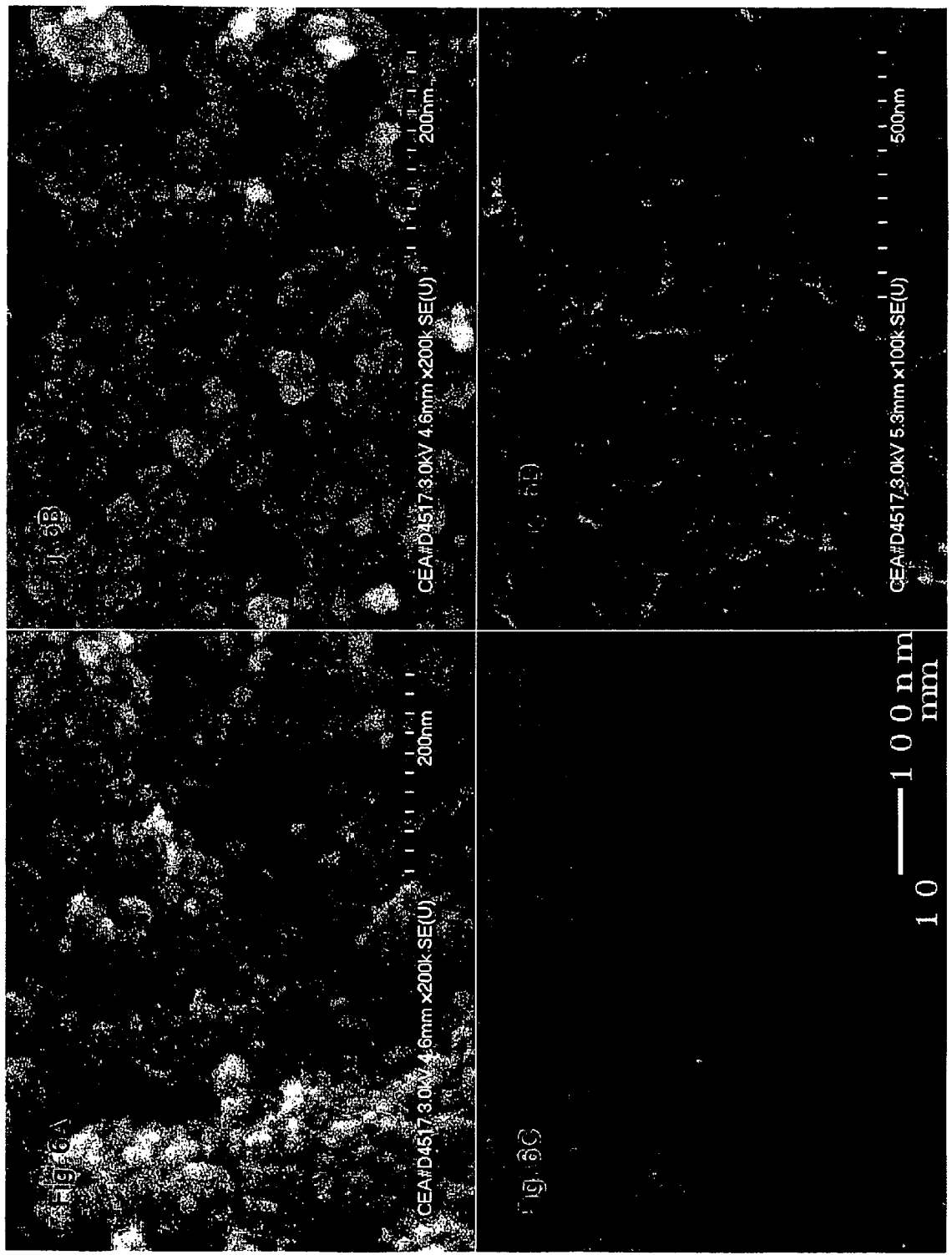

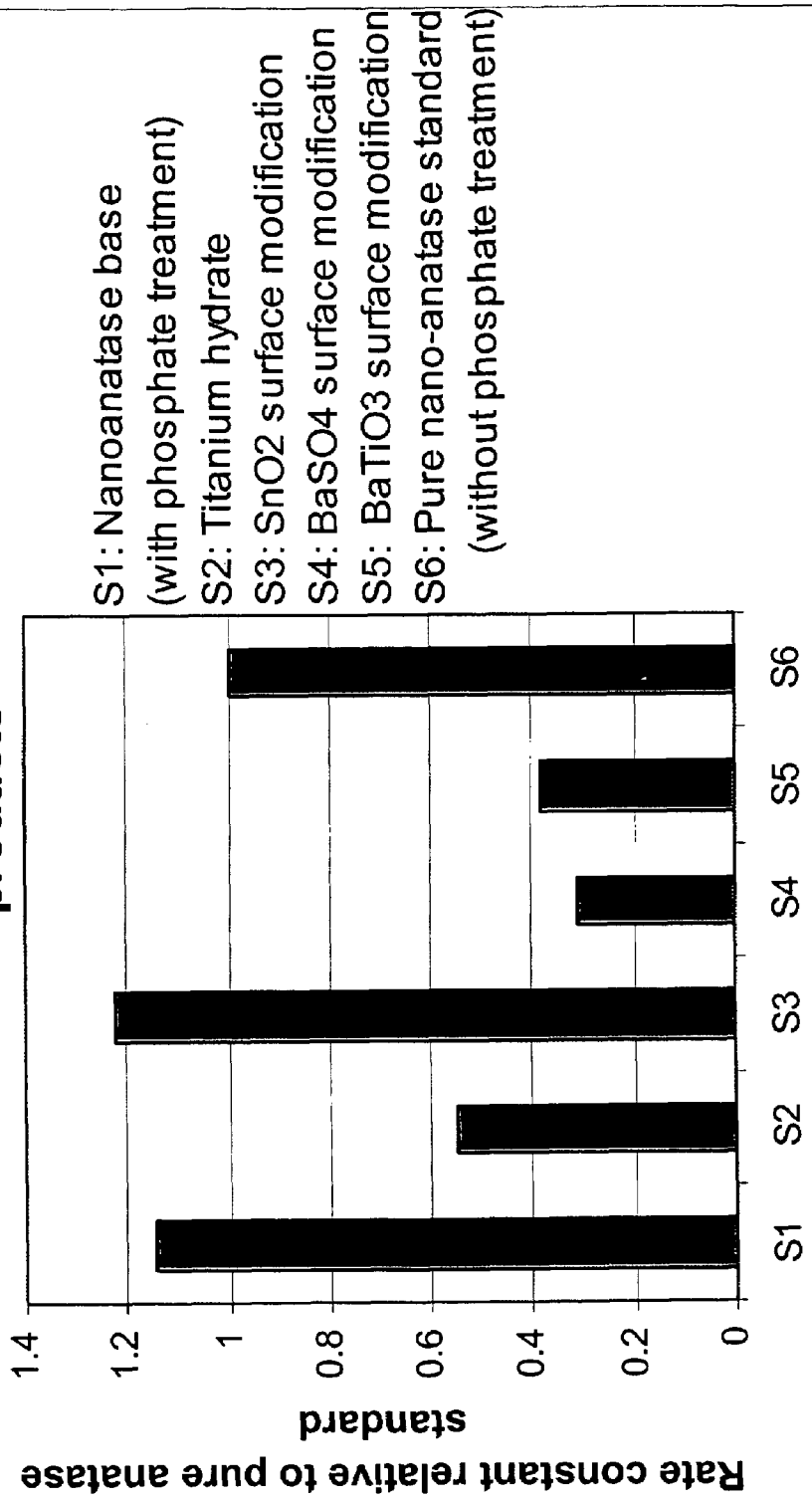
FIG. 7: Rate constants for the photochemical degradation of 4-CP on several surface-modified products
S1: Nanoanatase base (with phosphate treatment)
S2: Titanium hydrate
S3: SnO2 surface modification
S4: BaSO4 surface modification
S5: BaTiO3 surface modification
S6: Pure nano-anatase standard (without phosphate treatment)

Electrochemical characterization of the surface composition using cyclic voltammetry. Lithium titanate surface modification with a significant electrochemical response.

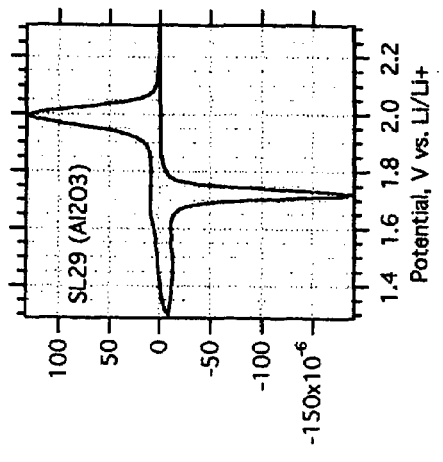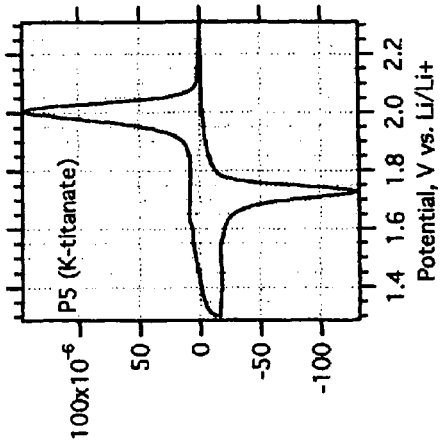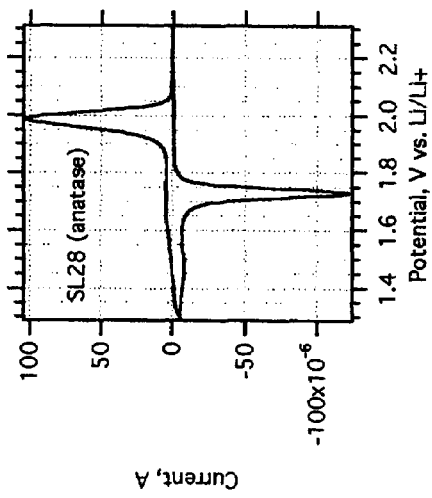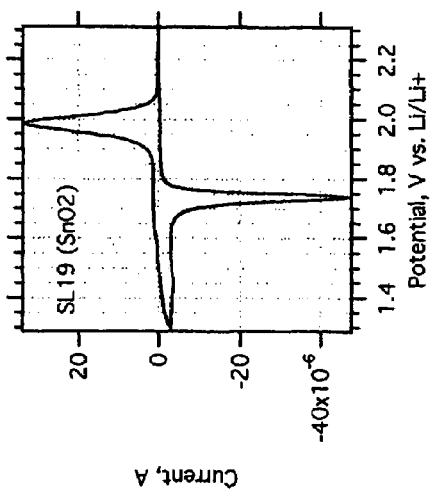
Fig. 9 Electrochemical characterization using cyclic voltammetry. Surface modifications with no significant electrochemical response.

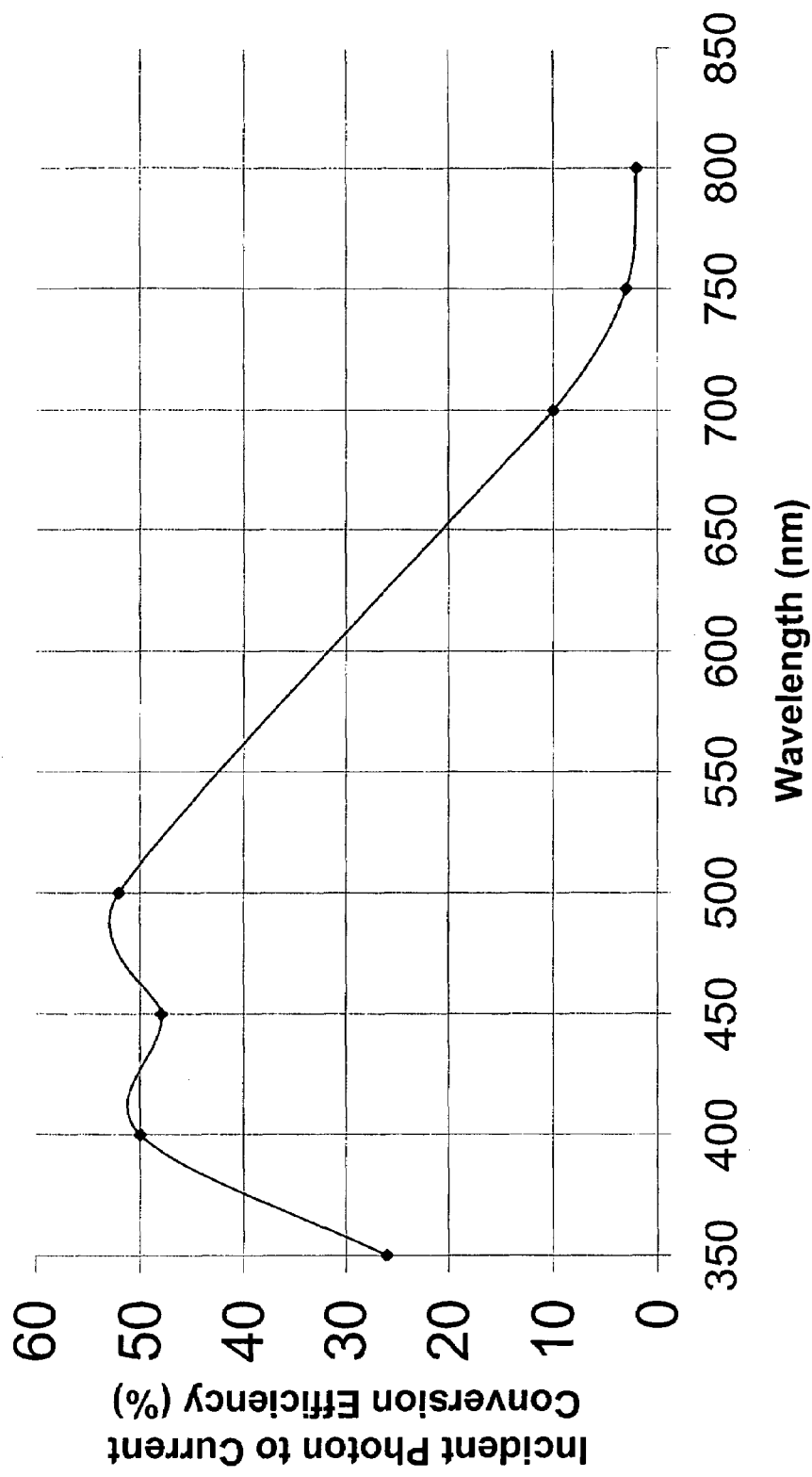

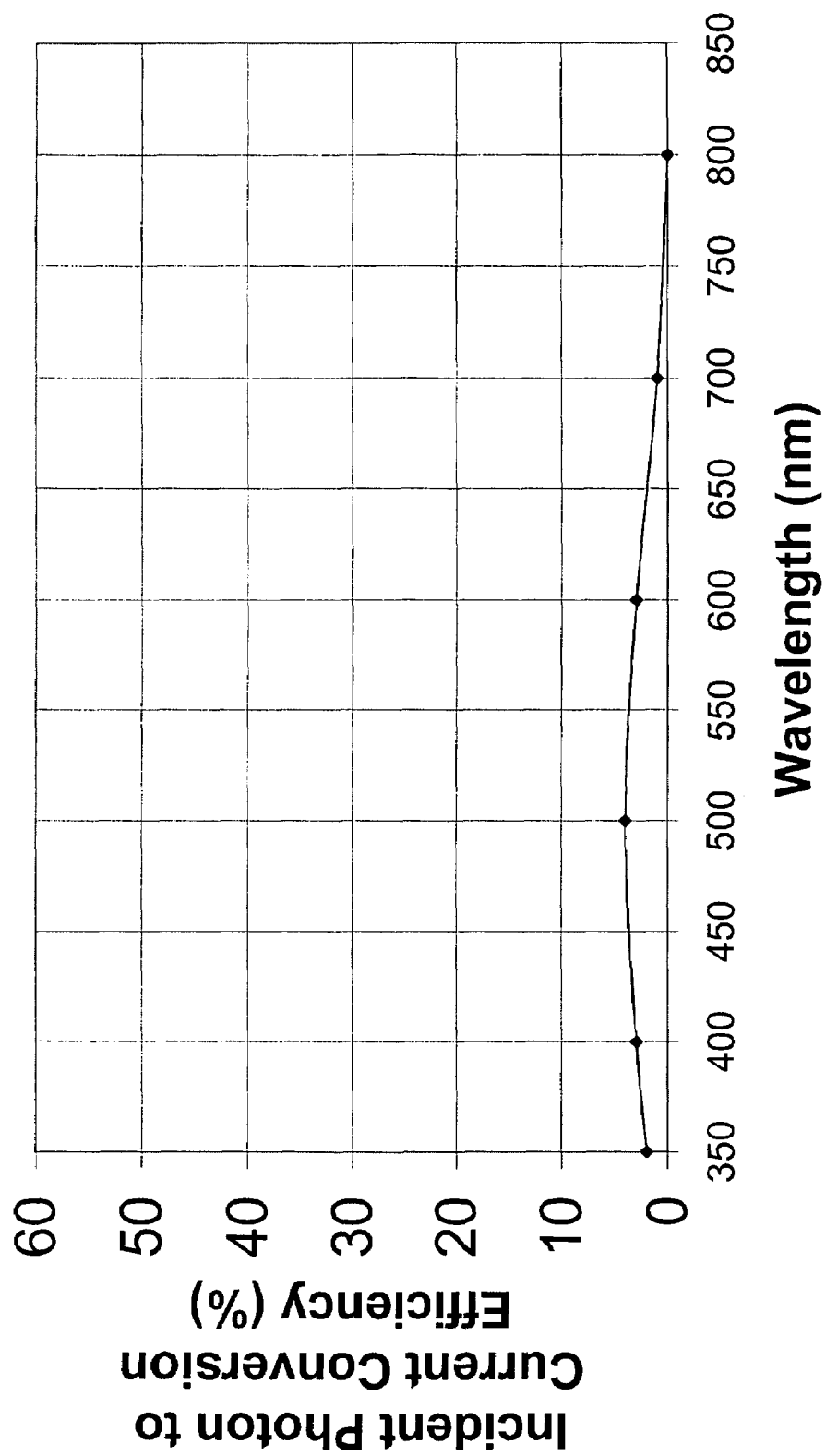

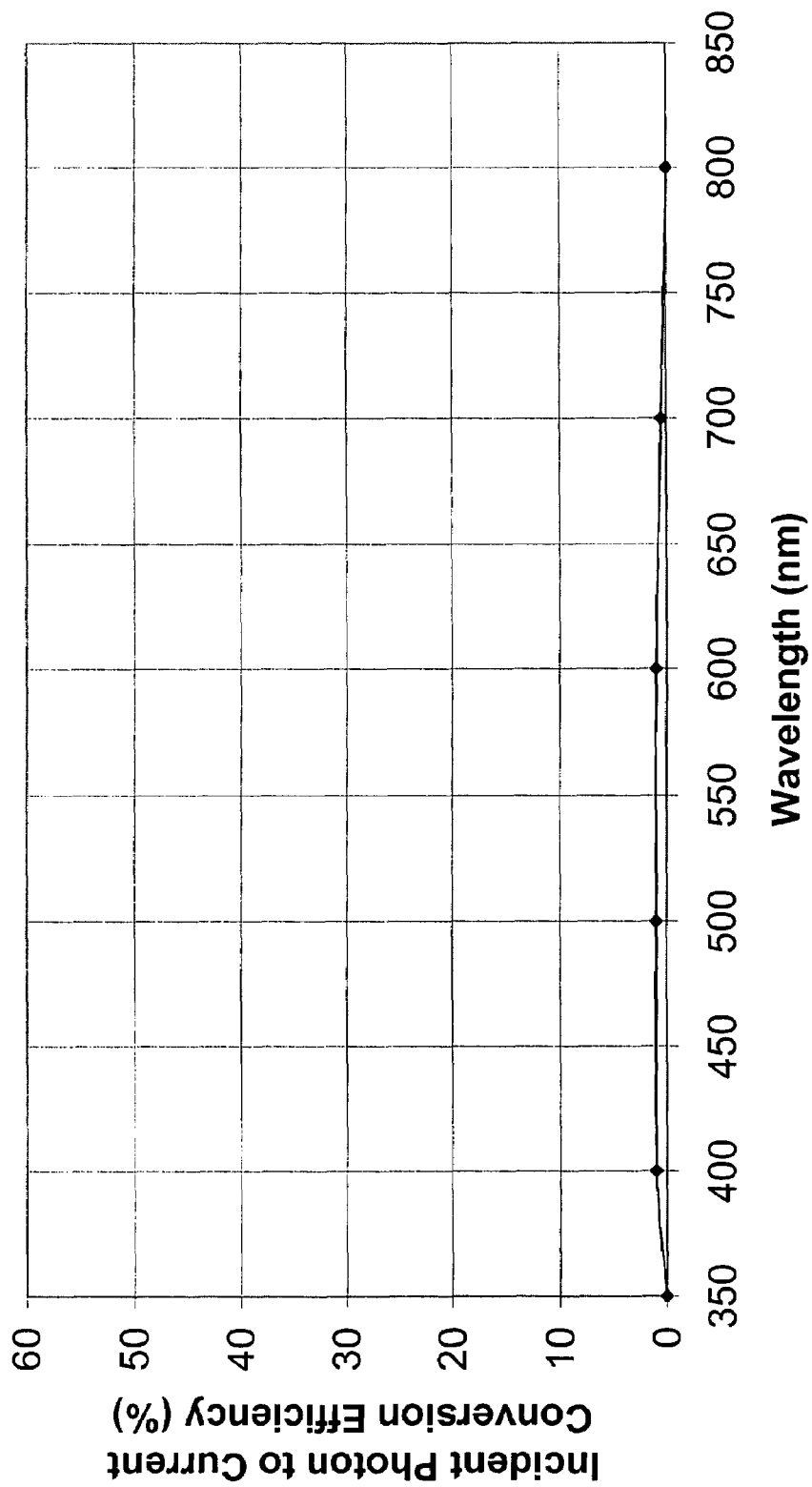
Fig. 10C - Photochemical measurement of potassium titanate modified surface

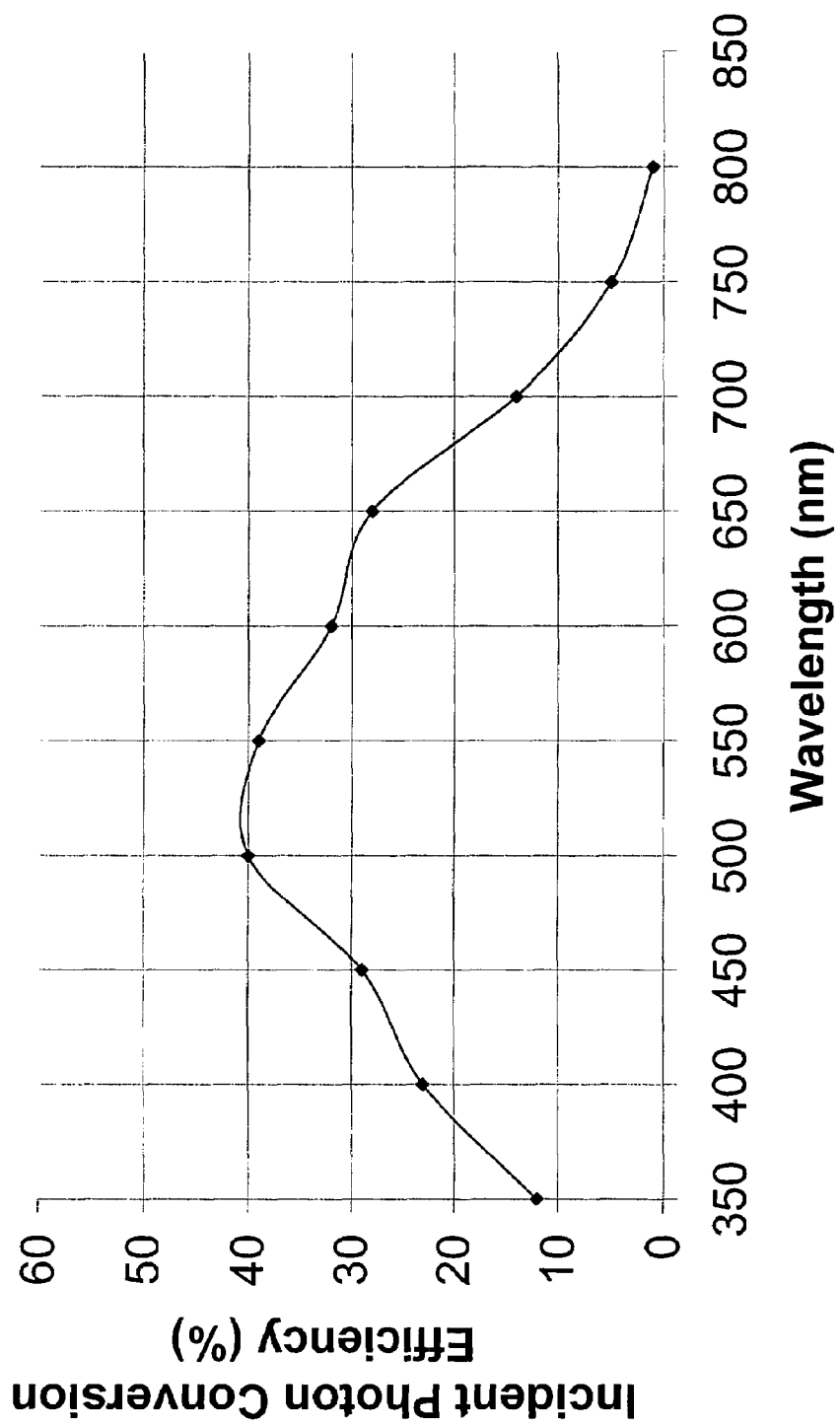
Fig. 10D - Photochemical measurement of tin oxide modified surface

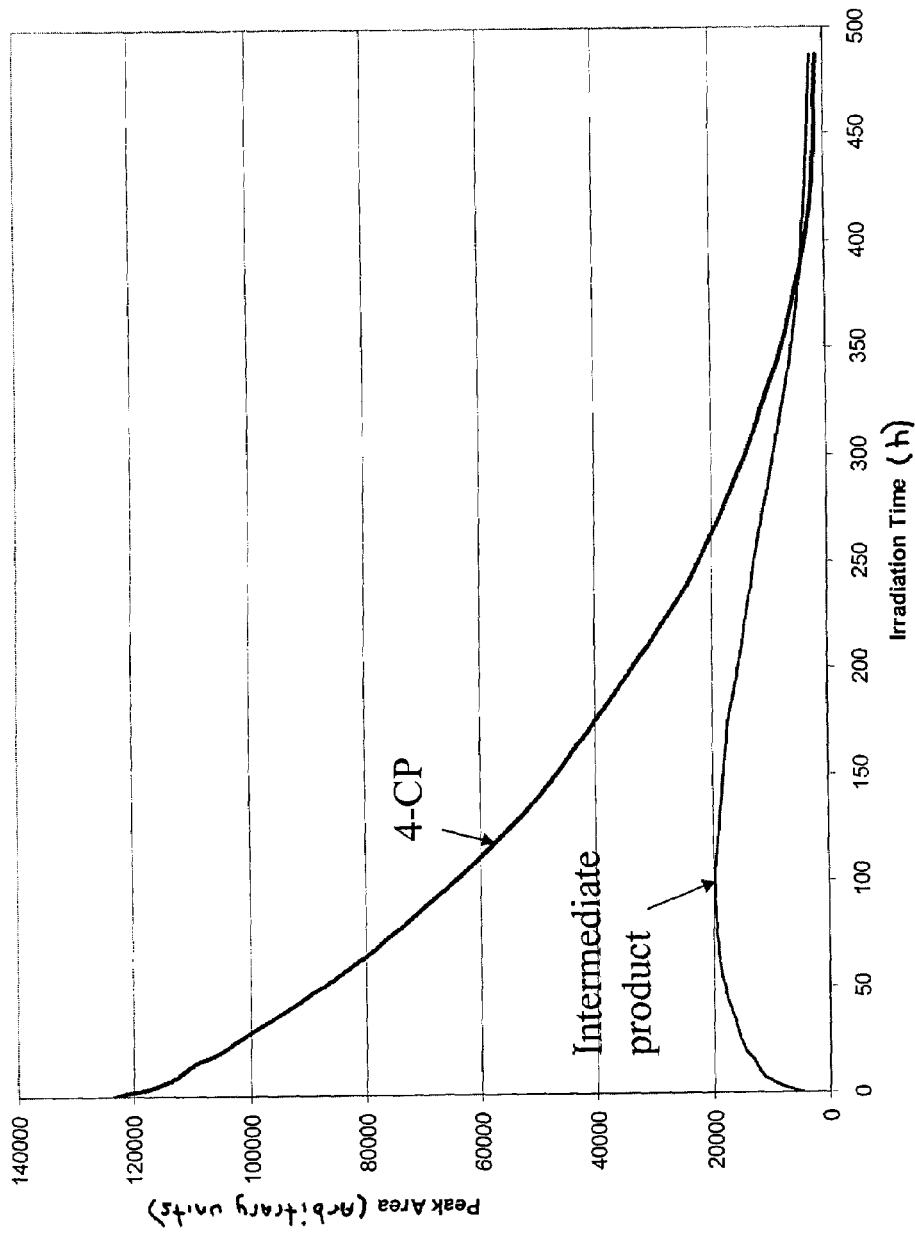
Fig. 11A – Photodegradation of 4-CP on nanoanatase with barium titantate surface layer, showing degradation of 4-CP and formation of intermediate degradation products

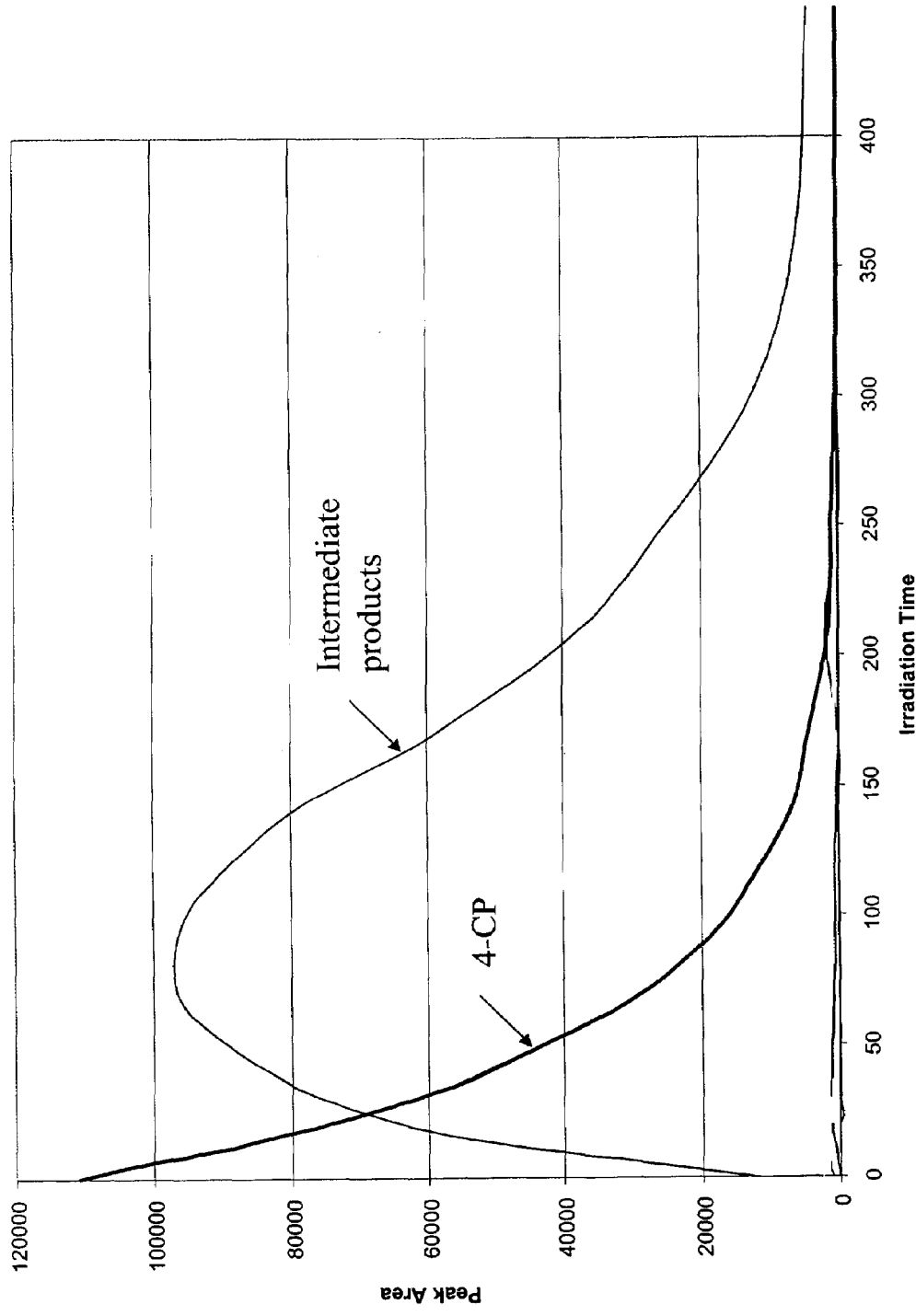
Fig. 11b: Photodegradation of 4-CP on nanoanatase base material, showing degradation of 4-CP and formation of intermediate degradation products

PROCESS FOR SURFACE MODIFICATIONS OF TIO₂ PARTICLES AND OTHER CERAMIC MATERIALS

The present invention relates to a process for making surface-modified particles of titanium dioxide and ceramic materials, parts of the process and the products of the process. The surface is modified by providing a layer of an inorganic compound. The layer of inorganic compound may be further treated with a dopant selected from an organic compound or an inorganic compound. The method is particularly effective when the titanium dioxide particles or ceramic material has a size less than 100 nm. Such particles are referred to as nano-sized particles.

Coatings or surface modifications of particles are often useful to impart special properties. An example of a particulate product that is often subjected to surface modification is $TiO_2$ in the anatase form. Anatase $TiO_2$ is strongly photocatalytic. This photocatalytic effect may be desirable, for example, for the removal of organic pollutants, but it will be undesirable when it leads to the decomposition of organic substrates or supports. Surface modification makes it possible to modulate the photocatalytic activity and other surface characteristics.

A number of different methods exist to apply surface modifications to ceramic particles and give them special properties. For example, U.S. Pat. No. 6,440,383 discloses a method to produce ultrafine $TiO_2$ particles. The method describes the use of additives to adjust the properties of the resulting $TiO_2$ particles. These additives may appear as a surface modification on the $TiO_2$ particles. For example, when phosphoric acid or a phosphate salt additive is used, particles with a coating of titanium pyrophosphate or another phosphate compound are obtained.

Processes have also been proposed for multiple-layer coatings on $TiO_2$. For instance, U.S. Pat. No. 6,291,067 discloses a method to coat particles with a porous layer of calcium phosphate and an anionic surface-active agent. The result is a product that still shows good photocatalytic activity towards decomposing organic matter while protecting the support on which the particles are placed. Other existing methods involve reacting titanium dioxide pigment with aluminum phosphate (U.S. Pat. No. 5,785,748), or adding consecutive layers of silica (or zirconia) and alumina between phosphate layers (U.S. Pat. No. 6,342,099).

It has now been found that new products with adjustable properties can be obtained by starting with $TiO_2$ made according to the process described in U.S. Pat. No. 6,440,383. Alternatively, a similar $TiO_2$ or other ceramic material can be used as the starting material. The term ceramic material as used in the following specification and claims refers to a hard, brittle, heat and corrosion-resistant compound that includes one or more metals in combination with oxygen, the manufacture of which involves a firing or calcination step. This starting compound may be subjected to a succession of surface modification steps with a dopant selected from the group consisting of an organic compound and an inorganic compound.

According to the process described in U.S. Pat. No. 6,440,383, ultrafine $TiO_2$ is made with phosphoric acid introduced as an additive. The addition of phosphate in the feed solution creates, in situ, a very thin titanium phosphate layer on the surface of the nanoanatase particle during the calcination step.

The $TiO_2$ produced according to U.S. Pat. No. 6,440,383 may be used as a starting material in the process according to the present invention. This $TiO_2$ starting material is dispersed in an aqueous slurry after the wet milling step. The pH of the slurry is increased by addition of a strong base such as KOH. The strong base reacts with the titanium phosphate surface layer and transforms it into a structure composed of a water insoluble titanate. In the case of KOH, the layer will have the approximate composition $K_2TiO_3$. Water-soluble phosphate ions (potassium phosphate) move into the solution. The particles at this stage of the process, with a layer of $K_2TiO_3$ on the surface, may be dried and calcined.

The $TiO_2$ particles with the $K_2TiO_3$ layer may be acidified by addition of HCl or another strong acid that is able to decompose potassium titanate. Water-soluble potassium salts, such as KCl in this case, migrate back into the solution and the $TiO_2$ particle surface transforms into a gelatinous hydrate of approximate formula $Ti(OH)_4$. The product at this stage of the process may be dried and used as a titanium oxide with a high surface area. Alternatively, the dried product may be further calcined to make crystalline $TiO_2$ in the anatase form. The product of the calcination may be further covered by an activated layer, preferably a layer of a metal.

The method of the present invention is particularly effective when the particles are nano-sized, because smaller particles have a relatively larger surface area, i.e. the number of molecules placed at the surface is larger compared to the total number of molecules, and any surface effect will be enhanced.

Following another aspect of the present invention, the product after acidification and washing may be further treated with a dopant that will attach to the external gel on the $TiO_2$ particle. The dopant may be selected from the group consisting of an inorganic compound and an organic compound. The inorganic compound may be selected from the group consisting of metals, colloidal metals, and metal salts. The metals may be selected from Ag, Au, Cu, Zn, Pt, Sn, W, V, Y, and Mn. When the metal is Ag, Au, Cu, Zn, or Pt, the metal is preferably added in colloidal form or as a dissolved metal salt. If the dopant is a colloidal metal, the product is dried, then gently calcined to form a metal/anatase layer on an anatase particle. In the case where the dopant is a thermally unstable salt of a metal as Sn, W, V, Y, or Mn, the product can be calcined to create a hard shell of oxide on the $TiO_2$ particle.

Suitable organic compounds include water-soluble organic compounds including but not limited to carboxylic acids, carboxylic acid salts, and alcohols.

Although the above process contemplated the use of $TiO_2$ made according to the process described in U.S. Pat. No. 6,440,383, a $TiO_2$ base made by any process, and modified with titanium phosphate, can be used. Particles of other compounds such as aluminum oxide, zirconium oxide or similar ceramic compounds that are resistant to strong acids and strong bases can also be used as the base material for the titanium phosphate deposition and the further steps described above.

BRIEF DESCRIPTION OF THE DRAWINGS

FIG. 5a shows a schematic of a portion of the method of the present invention, where the particle corresponding to FIG. 4 is further subjected to drying and calcination. FIG. 5b shows a scanning electron micrograph of a final product of nanoanatase particle surface modified by a zirconium oxide layer.

FIGS. 6a-6d show scanning electron micrographs for a base material and its surface modifications. FIG. 6a is a 20 nm nanoanatase base. FIG. 6b is a 20 nm nanoanatase base with a $SnO_2$-modified surface. FIG. 6c is a 40 nm nanoanatase base material. FIG. 6d is a 40 nm nanoanatase base after surface modification with silver.

FIG. 7 shows the rate constant of different surface-treated materials made according to the process of the present invention when the materials are used to decompose an organic material through photocatalytic action.

FIG. 8 shows cyclic voltamograms.

FIG. 9 shows the cyclic voltamogram of 20 nm nanoanatase base after surface modifications, which do not exhibit a noticeable electrochemical response. FIG. 9a shows a 20 nm nanoanatase base with a $SnO_2$ surface modification. FIG. 9b shows a 20 nm nanoanatase base with an anatase surface modification. FIG. 9c shows a 20 nm nanoanatase base with an $Al_2O_3$ surface modification. FIG. 9d shows a 20 nm nanoanatase base with a $Y_2O_3$ surface modification. FIG. 9e shows a 20 nm nanoanatase base with a potassium titanate surface modification.

FIG. 10 shows the photochemical performance of surface modified samples used in a Graetzel Cell setup. FIG. 10a corresponds to an activated anatase surface modification. FIG. 10b corresponds to a 20 nm nanoanatase base with lithium titanate surface modification. FIG. 10c corresponds to a 20 nm nanoanatase base with potassium titanate surface modification. FIG. 10d corresponds to a 20 nm nanoanatase base with tin dioxide surface modification.

FIG. 11a shows details of 4-CP photodegradation on 20 nm nanoanatase modified by a layer of barium titanate.

FIG. 11b shows details of 4-CP photodegradation on the same material as that shown in FIG. 11a, taken before treatment with the phosphate layer.

DETAILED DESCRIPTION

Figure 1:
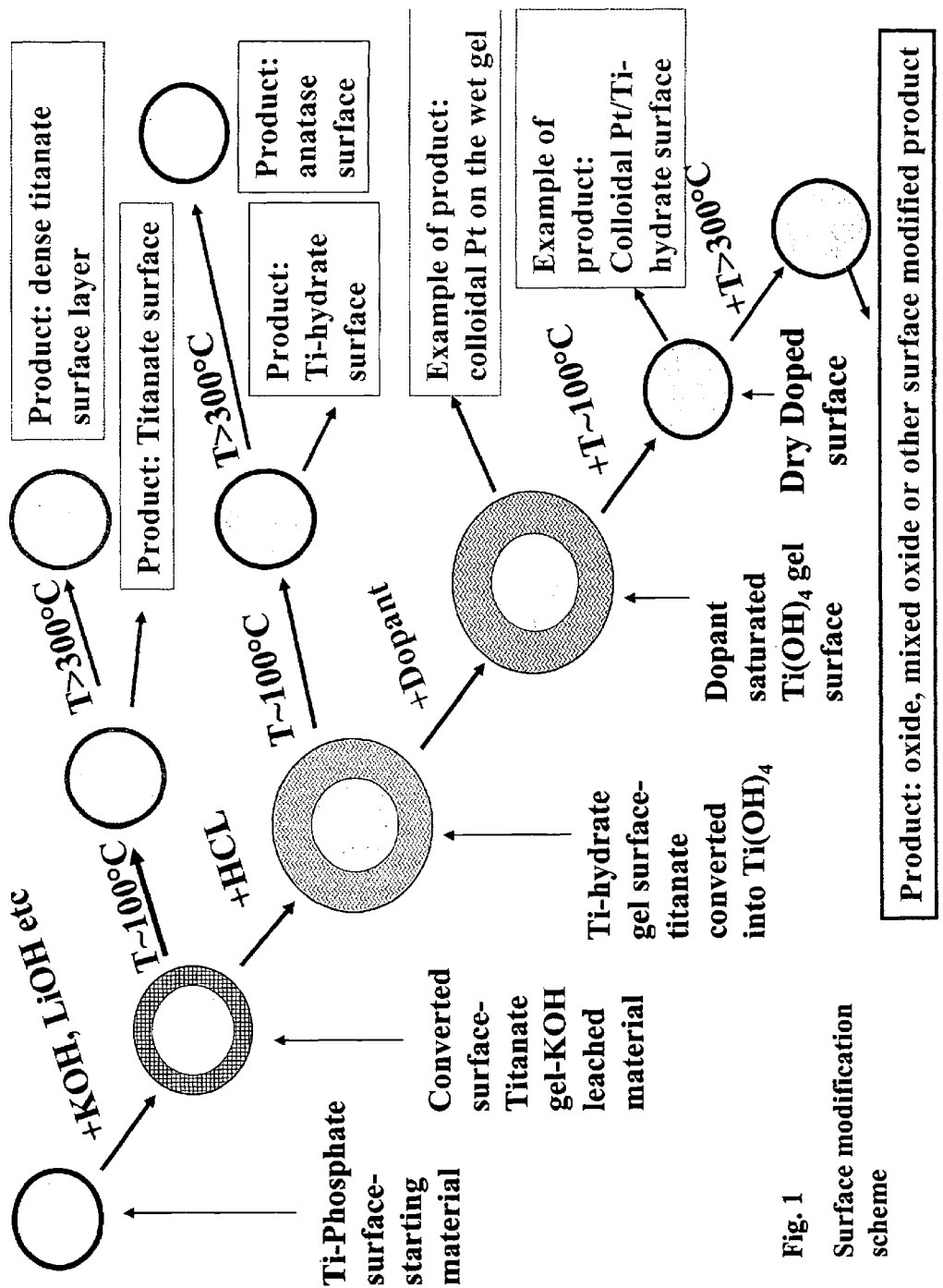
FIG. 1 shows a general schematic of one embodiment of the process according to the present invention.
Figure 2:
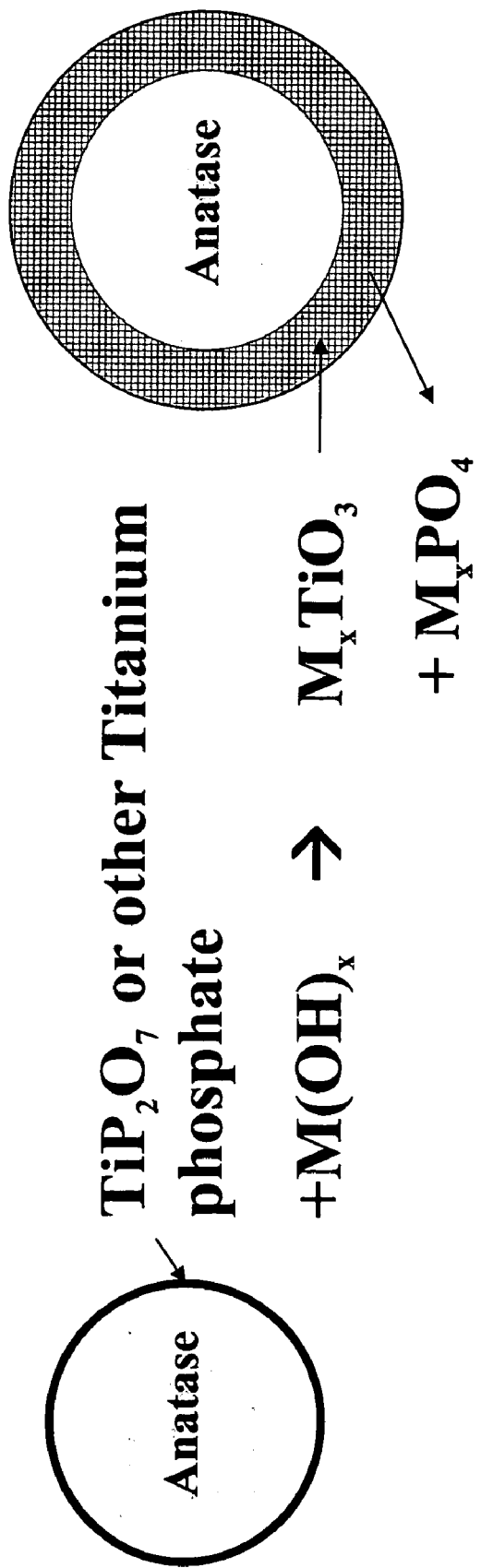
FIG. 2 shows a schematic of a portion of the method of the present invention where a strong base reacts with a titanium pyrophosphate layer on anatase titanium dioxide to form a titanate.

Turning now to FIG. 1, a general schematic process flow sheet of one embodiment according to the present invention is shown. Referring more particularly to FIG. 2, the initial portion of the process shown generally in FIG. 1 is shown. For ease of description, the process will be described with reference to the production of surface modified $TiO_2$ particles. It is to be understood, however, that the process may include starting with ceramic materials such as alumina or zirconia particles that have been coated with a layer of titanium phosphate or titanium pyrophosphate.

$TiO_2$ particles with a layer of phosphate or a layer of pyrophosphate on the surface may be made by any suitable process in one or more steps. One suitable process for making $TiO_2$ particles with a layer of phosphate or a layer of pyrophosphate is described in U.S. Pat. No. 6,440,383, where the chemical additive is phosphoric acid or a phosphate, the relevant portions of which are incorporated herein by reference. The layer of titanium pyrophosphate made by this method is no more than 2 nm thick. If it is attempted to make a thicker layer, the layer will separate from the $TiO_2$ base. This material will be referred to as the base material.

The base material is subjected to further surface modification by immersion in a strong base solution such as KOH, LiOH, NaOH, CsOH, and RbOH, or any hydroxide that produces a water insoluble titanate and a soluble form of phosphate by reaction with $TiO_2$.

For illustrative purposes, if the base is KOH, the reaction is believed to be of the form.

$$TiP_2O_7 + 8KOH \rightarrow K_2TiO_3 + 2K_3PO_4 + 4H_2O$$

The layer of phosphate on the $TiO_2$ base material is replaced by a titanate of a strong base on the surface of the $TiO_2$ particle. Such compounds formed by the action of a strong base on a ceramic oxide are generally known to be gelatinous. The same treatment with a strong base can be applied to other core materials such as alumina or zirconia, if titanium phosphate or pyrophosphate is first deposited on the surface.

The particles with the gelatinous titanate layer may be washed with water or a polar solvent in which the gelatinous layer is soluble and dried at a temperature from about 80° C. to about 250° C. to produce a $TiO_2$ core with a surface modified by an alkali metal titanate. The product of the drying step may be calcined at a temperature between about 250° C. and about 1000° C. The product resulting from the calcination is a dense titanate layer on the surface.

Figure 3:
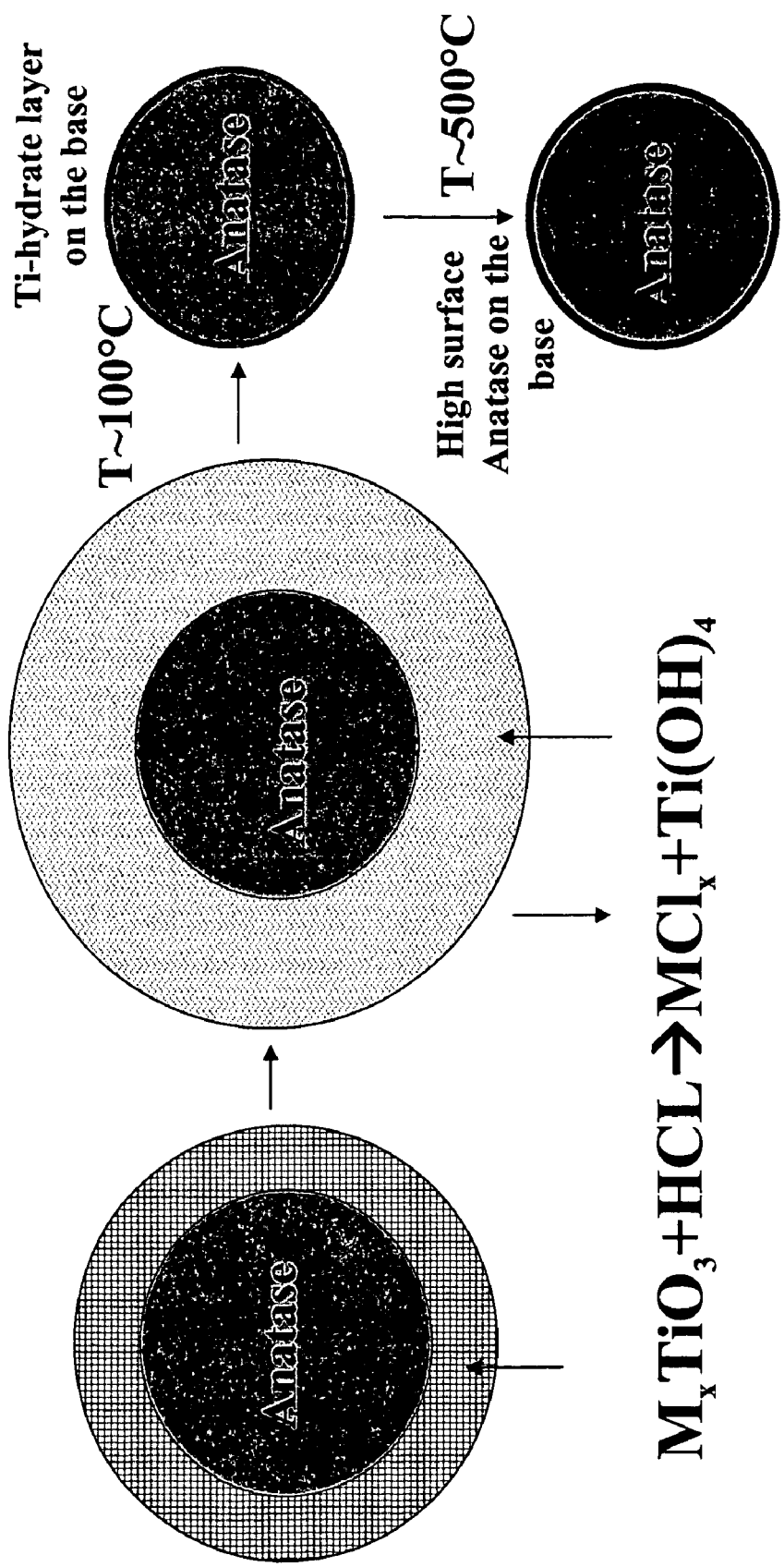
FIG. 3 shows a schematic of a portion of the method of the present invention, where HCl reacts with the titanate formed in the step shown in FIG. 2.

Turning now to FIG. 3, further steps of the general process depicted in FIG. 1 are shown. The product of the treatment by a base may be further subjected to treatment by a strong acid, such as hydrochloric acid. The strong acid attacks the layer of titanate of the strong base and leaves a gelatinous layer of hydrated titanium hydroxide. The reaction for the $K^+/HCl$ case may be written

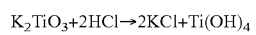

$$K_2TiO_3 + 2HCl \rightarrow 2KCl + Ti(OH)_4$$

After the KCl has been rinsed out with water or a polar solvent, a titanium hydrate layer 1 to 20 nm thick is formed on the particle. The product of this step may be dried at a temperature between about 80° C. and about 150° C. to produce a dry titanium hydrate. The dried product may be further calcined at a temperature between about 300° C. and about 800° C. Calcination will transform the hydrate into anhydrous $TiO_2$ crystals. By removing hydration water, the calcination process shrinks and hardens the gelatinous layer of hydrated titanium.

Alternatively, after the KCl has been rinsed, the particle having titanium hydrate on its surface with water or a polar solvent can be used as an intermediate for the next step of the surface modification process.

Figure 4:
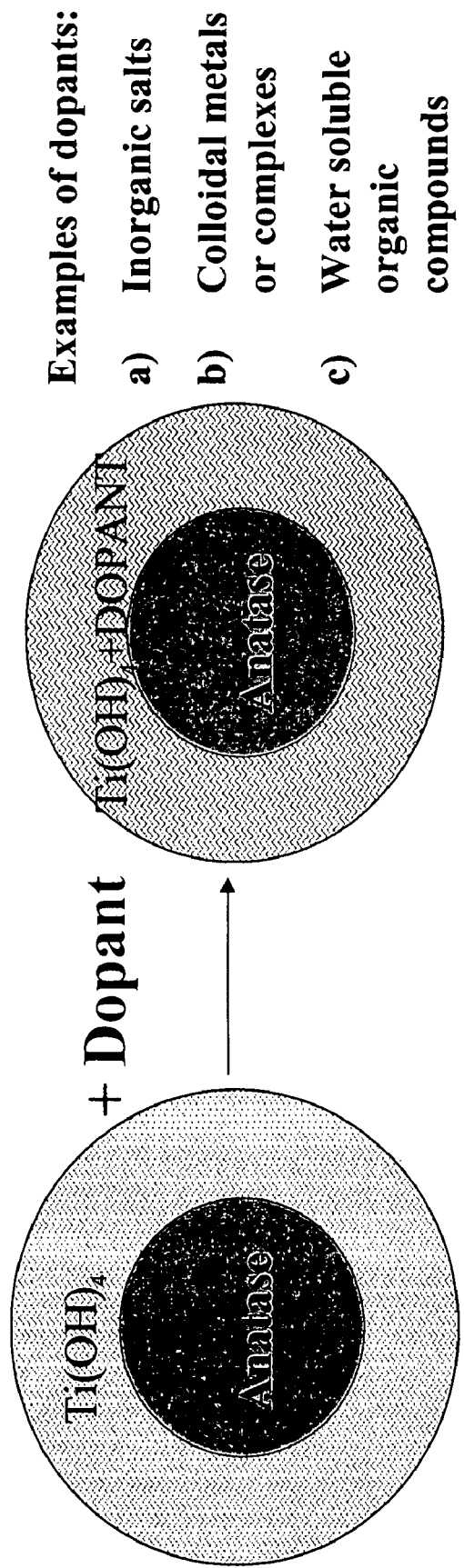
FIG. 4 shows a schematic of a portion of the method of the present invention, where the coating on the particle corresponding to FIG. 3 is further subjected to a doping step.

Referring to FIG. 4, a further possible step in the surface modification process is shown. The intermediate is treated with a dopant, desirably without drying or calcining. The dopant is typically a water-soluble compound that can penetrate the gel layer on the base surface. Possible dopants can be divided into three categories: organic compounds, inorganic compounds, and colloids. For example, the dopant may be a water-soluble organic compound, an inorganic salt, particularly a metal salt, or a colloidal metal or complex.

Possible organic compounds may be for example water-soluble amino acids, glycenes, and silenes. Possible inorganic compounds are metal salts or are any water or acid-soluble salt such as $SnCl_4$, $BaNO_3$, and $AlCl_3$. Possible colloids include metals such as Ag and Pt, or colloidal complexes. The dopants may be added as solutions or as colloidal suspensions. By controlling the concentration of the dopant in the solution, the final level of the dopant in the surface layer and the layer thickness can be controlled.

The doped material may be used as a final product, or dried and processed further, as shown in FIG. 5a. Referring to FIG. 5a, the dopant fixed in the dried titanium hydrate is converted into another compound by drying and calcination under a controlled atmosphere. Compounds of limited thermal stability used for surface doping can be decomposed by calcination and can be converted to other compounds. Oxides of the metal used in the surface modification process may be conveniently obtained. It is also possible to convert the surface modification layer to a metal layer by calcining under reducing conditions.

Drying causes shrinkage of the gel layer containing the dopants. Many products can originate from this stage. For example, Ti hydrate may be coated with a colloidal metal, a metal salt, an organic compound or a complex compound.

The product can be further calcined, generally to create a dry salt surface modification on the anatase or an oxidized salt layer on the particle surface. Some salts, such as metal nitrates, chlorides, acetates, and sulfates, decompose at temperatures lower than the anatase phase conversion point and can be used for this purpose. FIG. 5b shows a scanning electron micrograph of a final product of nanoanatase particles, surface-modified by a zirconium oxide layer.

Characterization of Surface Modified Samples

The following methods have been used to characterize the surface-modified products:

4-CP Photodegradation

To determine photocatalytic activity of the $TiO_2$ surface modified samples, the kinetics of disappearance of 0.1 mM 4-chlorophenol (4-CP) in 60 mL of aerated aqueous suspension of the photocatalyst (1 g/L) were monitored as a function of time. The apparatus consists of two coaxial quartz tubes placed in the middle of a steel cylinder with an aluminum foil covering its inner wall. The inner quartz tube (diameter 24 mm, length 300 mm) was filled with the investigated suspension (60 ml) and magnetically stirred. Cooling distilled water was circulating between the inner and the outer quartz tube to keep a constant temperature of 20° C. The source of monochromatic UV light ($\lambda$=365 nm) was a medium pressure mercury lamp closed in glass filter bulbs (RVU, 125 W, Tesla Holešovice, Czech Republic). The equipment was calibrated by ferrioxalate actinometry: the average light intensity entering the volume of 50-70 mL of irradiated solution was determined as $I_0$=4.9×10$^{-5}$ Einstein L$^{-1}$ s$^{-1}$. Probes of irradiated suspensions (0.5 mL) were taken at appropriate times. The solid photocatalyst (together with the adsorbed portions of the dissolved molecular species) was removed before analysis by liquid chromatography (HPLC), employing filtration through a Millipore syringe adapter (diameter 13 mm) with filter 408 (porosity 0.45 µm).

Ultra-violet/visible/near Infrared Diffusion Reflectance (UV/Visible/Near IR).

UV/visible/near IR diffusion reflectance spectra were measured from 2500 to 250 nm on a Perkin-Elmer Spectrophotometer Lambda 19 equipped with an integrating sphere. Both powders and their 35% aqueous suspensions were placed into a 1 cm spectroscopic cell and scanned against $BaSO_4$ plate as a standard. To enable quantitative evaluations, the measured values of reflectance versus wavelength were transformed into Kubelka-Munk unit vs. wave number coordinates. The Schuster-Kubelka-Munk theory gives the ratio of the absorption (K) to the scattering (S) coefficients as $K/S=(1-R\infty)2/2 R\infty)$ where $R\infty$ is reflectance measured as the ratio of the total intensities of light reflected from the sample and from the standard ($BaSO_4$). The liquid chromatography experiments were run on a Merck device with L-6200 Intelligent Pump, L-3000 Photo Diode Array Detector, and D-2500 Chromato-Integrator. Mobile phase methanol/water (2:3; v/v) and a Merck column LiChroCART 1254 filled with LiChrosphere 100 RP-18 (5 µm) were used, injection loop was 20 µL, flow rate 1 mL min-1 and detection wavelength 280 nm were applied.

Electrochemical Tests

Pure $TiO_2$ film electrodes, prepared from corresponding surface modified materials were tested by cyclic voltametry in 1 M $LiN(CF_3SO_2)_2$ electrolyte solution. Dark electrochemistry in Li$^+$ containing solution is a useful tool to characterize the structure and morphology of electrodes from nanocrystalline anatase and can determine trace amounts of electrochemically responding materials. Electrochemical measurements were carried out in a one-compartment cell using an Autolab Pgstat-20 (Ecochemie) controlled by GPES-4 software. The reference and auxiliary electrodes were from Li metal, hence potentials are referred to the Li/Li$^+$ (1 M) reference electrode. In all cyclic voltametry experiments, the direction of the first potential sweep was (1) equilibrium potential (2) lower vertex potential (3) upper vertex potential. $LiN(CF_3SO_2)_2$ (Fluorad HQ 115 from 3M) was dried at 130° C./1 mPa. Ethylene carbonate (EC) and 1,2-dimethoxyethane (DME) were dried over a 4A molecular sieve (Union Carbide). The electrolyte solutions M $LiN(CF_3SO_2)_2$+EC/DME (1/1 by mass), contained 10-15 ppm $H_2O$ as determined by Karl Fischer titration (Metrohm 684 coulometer). All operations were carried out in a glove box.

Solar Cells and Photoelectrochemical Measurements

The sensitized electrodes prepared from the surface treated anatase were assembled into solar cells. The test cells were thin-layer sandwich-type solar cells with reflecting Pt counter electrode. The latter was a 2 µm-thick Pt mirror, which had been deposited on $SnO_2(F)$ conducting glass by vacuum sputtering. The counter-electrode was placed directly on top of the dye-coated $TiO_2$ film, supported by conducting glass sheet. Both electrodes were tightly clamped together. A thin layer of the electrolyte was attracted into the inter-electrode space by capillary forces. All tests employed the same electrolyte, gamma-3. The electrolyte gamma-3 is based on $I^-/I_3^-$ redox couple in γ-butyrolactone medium.

The dye-coated $TiO_2$ film was illuminated through the conducting glass support. The light source was a 450 W xenon lamp that was focused to give light power of 1000 W/m$^2$ at the surface of test cell. The spectral output of the lamp was matched in the wavelength region of 350-750 nm with the aid of a Schott KG-5 sunlight filter. This reduced the mismatch between the simulated and the true solar spectrum to less than 2%. The differing intensities were regulated with neutral wire mesh attenuator. The basic cell characteristics were measured at three different light intensities, equivalent to 10% Sun, 50% Sun and 100% Sun. The applied potential and cell current were measured using a Keithley model 2400 digital source meter. The current-potential characteristics of the cell under these conditions were determined by biasing the cell externally and measuring the generated photocurrent. The solar energy conversion efficiency, η, is defined as follows:

$$\eta = J_{pmax} \cdot U_{pmax}/P_L \tag{1}$$

$J_{pmax}$ is the photocurrent density (in A/m$^2$ (projected electrode area)), $U_{pmax}$ is the cell voltage and $P_L$ is the light intensity (in W/m$^2$). $P_L$ is the incident light power, determined in front of the window, which is not corrected for absorption and reflection losses in the window, electrolyte solution, and electrode. The actual values of $J_{pmax}$ and $U_{pmax}$ are determined from the current-potential characteristics of the cell, while their product $J_{pmax} \cdot U_{pmax}$ (the cell output power) is maximum. The ratio of such defined maximum output power to the product of maximum current density (short circuit current density, $J_{SC}$) and the maximum cell's voltage (open circuit voltage, $U_{OC}$) gives the cell's fill factor, f:

$$f = J_{pmax} \cdot U_{pmax} / J_{SC} \cdot U_{OC} \quad (2)$$

A similar data-acquisition routine was used to measure the incident photon-to-current conversion efficiency (IPCE) with monochromatic light. Light from 300 W xenon lamp was focused through a high throughput monochromator onto the solar cell under test.

As a rule, every material passed several photoelectrochemical tests to avoid casual experimental errors and to check the reproducibility of measurement. Each individual fabrication run provided 10 electrodes whose properties (layer thickness, mass, porosity etc.) were identical. The standard quadratic error in a set of parallel measurements on these electrodes from one batch was not larger than 7%.

After completing the photoelectrochemical tests, the solar cell was disassembled, and the photo electrode was carefully washed by acetonitrile and dried in air. Such electrode was subjected to two additional tests: (1) check of the layer thickness by alpha-step profilometer (2) measurement of the amount of adsorbed dye N-719. The adsorbed N-719 was determined as follows:

The sensitized electrode was dipped into 3.00 mL of phosphate buffer (pH 7) and the solution was stirred for about 5 minutes to complete the desorption of N-719 into the buffer. The resulting solution of N-719 was analyzed spectrophotometrically in 1.00 cm quartz optical cell (Hellma). The concentration of N-719 was calculated using the following extinction coefficients (in $M^{-1} cm^{-1}$):

53 000 ($\lambda$=308 nm); 12 700 ($\lambda$=372 nm); 13 600 ($\lambda$=500 nm)

The extinction coefficients were determined by using a fresh standard $10^{-5}$ M solution of N-719. The solution was prepared by dissolving of 1.55 mg of pure solid N-719 in 125 mL of phosphate buffer. (It is recommended that the test and reference solutions of N-719 be prepared freshly before each series of spectrophotometrical measurement. The reason is that the optical densities are not stable during long-term storing. Decrease by 28% was found after 27 days of storage of the $10^{-5}$ M solution of N-719 at ambient conditions).

The surface coverage of a dye, $\Gamma_d$ was determined by using the BET surface areas provided for each material. Alternatively, the surface coverage was expressed as the relative area per one molecule of N-719 ($A_M$). Both the $\Gamma_d$ and $A_M$ values assume two simplifications: (1) The surface area, "seen" by the $N_2$ molecule (in BET measurement) is identical to the surface area "seen" by the N-719 molecule, although the latter is considerably larger, hence, the N-719 molecule cannot penetrate into very narrow pores (2) The BET area of a powder precursor is equal to the physical area of the electrode; in other words, the loss of surface area, caused by sintering of nanopowder, is neglected. The latter correction should be considered especially in small nanocrystals: it has been found that there is about a 15-37% loss of surface area if nanocrystalline $TiO_2$ powder having 47404 $m^2/g$ is sintered into electrode layers. Obviously, the above approximations give the lower estimate for $\Gamma_d$ and the upper estimate for $A_M$.

Characterization Results

FIG. 7 shows the contrast in photocatalytic behavior between different surface-treated materials. The anatase core is the same in all samples, but the surfaces were treated with different compounds. In this figure, Sample S1 is $TiO_2$ anatase coated with a thin layer of titanium phosphate or pyrophosphate. This material served as basis for the surface modifications corresponding to the other samples. Sample S2 is titanium hydrate without surface modification. Samples S3, S4, and S5 are $TiO_2$ samples with surface modification by $SnO_2$, $BaSO_4$ and $BaTiO_3$ respectively. S6 is a pure nanoanatase standard given as reference.

It is difficult to determine the chemical formula of a material, existing as few nanometer thin film on the base surface. XRD was used to determine possible separation of phases, but it is not a good characterization method to identify a chemical composition of an ultra thin layer on a particle surface. Chemical composition of some of these materials was determined by electrochemical characterization by cyclic voltametry.

Figures 8A, 8B:
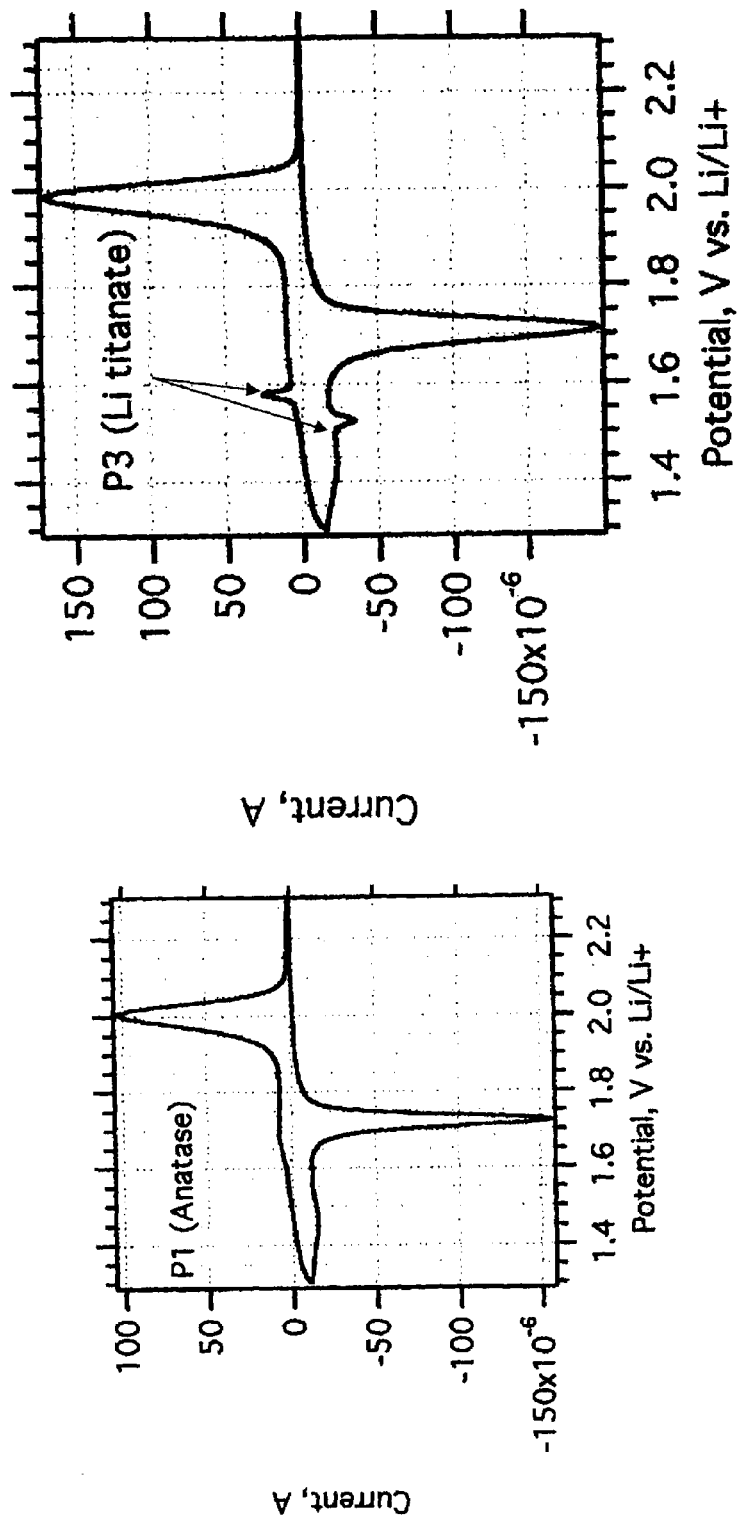
FIG. 8a shows the cyclic voltamogram of the 20 nm nanoanatase base before surface modification.
FIG. 8b shows the cyclic voltamogram of a 20 nm nanoanatase base after lithium titanate surface modification that shows a significant electrochemical response.

FIGS. 8a and 8b show voltamograms of the nanoanatase base material before and after the nanoanatase base was surface-modified with lithium titanate. There is a clear electrochemical response on the graph, corresponding to the compound $Li_4Ti_5O_{12}$.

FIGS. 9a-9e show surface modifications with compounds that do not exhibit a significant electrochemical response.

FIGS. 10a-10d show incident photon to current conversion efficiency measurements of four surface-treated materials. Performance of each of these materials in a Graetzel Cell set up is vastly different which underscores the impact of the modified surface on the overall properties of the product.

The following Examples are meant to illustrate but not limit the present invention or claims.

EXAMPLE 1

Examples of Base Material Manufacturing

Method 1

A solution containing 120 g/l Ti and 400 g/l Cl was made by injecting titanium chloride into a hydrochloric acid solution. Phosphoric acid was added to this solution in an amount corresponding to a phosphorous/titanium weight ratio of 0.04. The solution was fed to a spray dryer at a rate of 2.25 liters/min through an atomizing disk. Gases from the combustion of natural gas, diluted with air to 550° C., were also injected around the disk. The outlet temperature was 250° C. and the total gas flow rate was about 800 scfm. Reactor off gases were sent to a bag filter to collect the $TiO_2$ product. The collected product was further calcined at 800° C. for 8 hours then dispersed by wet milling. The slurry produced by the milling operation was used as the anatase base material for surface modifications. FIG. 6a shows a scanning electron micrograph of the product.

Method 2

A powder of $Al_2O_3$ was mixed with a solution of titanium phosphate and HCl and spray-dried. The flow and temperature conditions of the spray drier were the same as those given in Method 1. The product of the spray-drying step was calcined at 900° C. and micronized. The photocatalytic activity was determined by the method described above and was found to be low.

Method 3

A powder of $ZrO_2$ was mixed with a solution of titanium phosphate and HCl and spray-dried under the same conditions as those described in Method 1. The product of the spray-drying step was calcined at 900° C. and dispersed by wet milling. The photocatalytic activity of this base material was close to zero.

EXAMPLE 2

The nano anatase slurry product prepared by Method 1 of Example 1 was mixed with a concentrated solution of lithium hydroxide, then thoroughly washed with water and dried at 150° C.

The composition of the new surface obtained by this procedure was determined by cyclic voltametry to be $Li_4Ti_5O_{12}$, as shown in FIGS. 8a and 8b. This $Li_4Ti_5O_{12}$ surface-modified sample was photochemically characterized in the Graetzel Cell set up described above. The semiconducting properties of the anatase core were shielded by the $Li_4Ti_5O_{12}$ coating. The energy conversion was very poor, as shown in FIG. 10b, most likely because of electron transfer through the nonconductive lithium titanate layer on the anatase surface.

EXAMPLE 3

The nanoanatase slurry product prepared by Method 1 of Example 1 was mixed with a concentrated solution of potassium hydroxide, then thoroughly washed, dried at 150° C. and calcined at 500° C.

The exact chemical composition of the new surface obtained by this procedure is not known. It is assumed that a hard shell of potassium titanate of approximate formula $K_2TiO_3$ formed. The potassium surface modified sample was photochemically characterized in the Graetzel Cell setup. FIG. 10c shows that the semiconducting properties of nanoanatase were completely blocked by the $K_2TiO_3$ layer.

EXAMPLE 4

The nanoanatase product prepared by Method 1 of Example 1 was leached in KOH, washed in de-ionized water, then immersed in HCl and washed again in de-ionized water, until the pH reached 4-5. The result is a gelatinous coating that was dried at 150° C. The rate of decomposition of 4-CP decreased by a factor of about 2 compared to the rate observed with untreated anatase $TiO_2$ (see FIG. 7).

EXAMPLE 5

The product of Example 4 was further calcined at 500° C. for 2 h. The rate of decomposition of 4-CP increased compared to Example 4. Nanoanatase with this surface treatment also significantly improved the performance of the Graetzel Cell (see FIG. 10a). The electrochemical behavior of this product is shown in FIG. 9b (labeled as sample SL28).

EXAMPLE 6

Nano-sized anatase prepared by Method 1 of Example 1 was leached in KOH, washed in de-ionized water, then immersed in HCl solution and washed again in de-ionized water, until the pH reached 1-2. The product of this treatment has a gel-like surface made of a titanium hydrate. This product was further doped with tin chloride, spray dried, and calcined at 800° C. to form a shell of $SnO_2$ on the surface of the core made of nanosized anatase. (see FIG. 6b).

The rate of decomposition of 4-CP increased compared to the previous example (compare sample S3 with sample S2 in FIG. 7) and this surface treatment shows an improved performance in the Graetzel Cell application as shown in FIG. 10d).

The $SnO_2$, presumably present as a hard shell surface modification did not produce any additional peaks on the cyclic voltamogram. Accordingly, it appears that this coating is substantially transparent to $Li^+$ ions migrating in and out of the anatase core.

EXAMPLE 7

The nano-sized anatase slurry product prepared by Method 1 of Example 1 was mixed with a concentrated solution of hot barium hydroxide, thoroughly washed, dried at 150° C., and calcined at 800° C. The exact chemical composition of the new surface obtained by this procedure is not known. It is assumed that a hard shell of barium titanate of approximate formula $BaTiO_3$ is formed. The rate constant for the reaction of 4-CP in the presence of this sample is given in FIG. 7, sample S5. The 4-CP disappearance was slower than for the reference sample of untreated anatase $TiO_2$. One can also see, by comparing FIGS. 11a and 11b, that the amount of intermediate products produced during photodecompsotion of the 4-CP is much smaller in the case of a barium titanate layer than in the case of the nanoanatase base material.

EXAMPLE 8

The product prepared by Method 1 was leached in KOH, washed in DI water, then immersed in HCl and washed again in DI water until the pH reached 4 to 5. The result is a gelatinous coating of titanium hydrate as described in Examples 4 and 6. This coating was further saturated with colloidal platinum and gently dried.

EXAMPLE 9

The washed nanoanatase with the gelatinous surface, prepared as described in Example 4 was further saturated with ascorbic acid in darkness and gently dried. After the dried product was exposed to daylight, it turned brown, as the organic compound was photo-oxidized on the anatase surface.

EXAMPLE 10

The washed nanoanatase with the gelatinous surface, prepared as described in Example 4 was further slurried in an aqueous solution of $KH_2PO_4$ and spray-dried. The resulting spray drier discharge was calcined at 500° C. for 5 h. A scanning electro micrograph of the product showed that about 10% of the $KH_2PO_4$ was present as a thin layer on the surface of the anatase. The thickness of the layer was estimated at less than 0.5 nm.

While there have been described what are presently believed to be the preferred embodiments of the invention, those skilled in the art will realize that changes and modifications may be made without departing from the spirit of the invention. It is intended, therefore, to claim all such changes and modifications that fall within the true scope of the invention.

What is claimed:

1. A process for making surface-modified ceramic materials comprising:
   a. creating a layer of a titanium phosphate on a base material;
   b. subsequently treating with a strong base;
   c. washing the product of step b to form a first intermediate;
   d. contacting the intermediate with a strong acid; and e. subsequently washing the product of step d to form a second intermediate having a gelatinous layer of titanium oxide hydrate on the base material.

2. The process of claim 1 further comprising drying the second intermediate.

3. The process of claim 2 further comprising calcining the dried product.

4. The process of claim 2 further comprising sequentially treating the dried product with a dopant and then drying.

5. The process of claim 4 further comprising calcining the dried product.

6. The process of claim 4 where the dopant is a noble metal resistant to strong base and strong acid.

7. The process of claim 1 further comprising treating the second intermediate with a dopant.

8. The process of claim 7 wherein the dopant is selected from the group consisting of a colloidal metal, a colloidal complex, an organic compound, an inorganic salt, and mixtures thereof.

9. The process of claim 8 wherein the dopant is a colloidal metal and the final product has a metal oxide surface layer.

10. The process of claim 1 where the base material is titanium dioxide.

11. The process of claim 1 where the base material is selected from the group consisting of a ceramic metal oxide, a ceramic mixed oxide, a mixed metal oxide, and a mixture thereof.

12. The process of claim 11, where the ceramic metal oxide is selected from the group consisting of $TiO_2$, $ZrO_2$, $Al_2O_3$, and mixtures thereof.

13. The process of claim 12 where the ceramic metal oxide consists of nano-sized particles with a size between 20 and 100 nm.

14. The process of claim 1 where the strong base is KOH.

15. The process of claim 1 where the strong acid is HCl.

16. The process of claim 1 further comprising:
a. saturating the surface of the second intermediate with a water-soluble organic or inorganic compound;
b. subsequently drying; and
c. calcining.

17. The process of claim 1 further comprising:
a. saturating the surface of the second intermediate with a colloid material;
b. subsequently drying; and
c. calcining.

* * * * *